United States Patent Office 3,227,688
Patented Jan. 4, 1966

3,227,688
PROCESS FOR THE PRODUCTION OF POLYMERIC HYDROXY-CARBOXYLIC ACIDS FROM POLYACROLEIN AND PRODUCTS SO OBTAINED
Werner Kern, Rolf Schulz, and Erwin Müller, Mainz, Germany, assignors to Deutsche Gold- und Silber-Scheideanstalt vormals Roessler, Frankfurt am Main, Germany
No Drawing. Filed July 2, 1959, Ser. No. 824,452
Claims priority, application Germany, July 3, 1958, D 28,439
6 Claims. (Cl. 260—67)

The present invention relates to a process for the production of polymeric hydroxy carboxylic acids.

The object of this invention is to produce macromolecular polymers the principal chain of which contains a large number of hydroxy and carboxylic radicals.

As is well known, it is possible to react macromolecular polymerization products of the acroleins, in acid or alkaline mediums, with compounds which will react with the aldehyde groups present in the acrolein polymers in order to produce functionally soluble polymeric derivatives.

Furthermore, it has already been suggested that high molecular weight polyacrolein be transformed into polybasic macromolecular acids by treating the former with organic or inorganic oxidizing agents.

A typical reaction for certain lower molecular aldehydes is the Cannizzaro disproportionation reaction in which a mol of acid and a mol of alcohol are produced from two mols of the aldehyde. Strong bases are usually employed as catalysts in this reaction. However, the reaction is limited only to those aldehydes which do not contain an H atom in α position and therefore are not susceptible to the aldol condensation reaction.

The polyacroleins, which are produced by spontaneous, redox or other radical addition polymerization techniques, are macromolecular materials, which contain a large number of aldehyde groups along the paraffin type principal chain. These aldehyde groups are masked; however they are responsive to a series of characteristic aldehyde reactions. (See, in this regard, R. C. Schulz and W. Kern, Macromolecular Chemistry 18/19, 4, 1956, and R. C. Schulz, Synthetics 47, 303, 1957, and U.S. application S.N. 573,349, filed March 23, 1956.)

The technique of treating a latex or a dispersion of methyl acrolein polymerizates or methyl acrolein mixed polymerizates with a base, which has a higher dissociation constant then ammonia hydroxide, at higher temperatures of at least 70° C. is also known to the art. The modified polymeric product thus produced is characterized by a number of hydroxylic and carboxylic groups, which are arranged along the length of the macromolecule.

It has now been found according to this invention, that polymeric hydroxy-carboxylic acids can be produced if the above macromolecular polyacroleins or mixed polymerizates of the acrolein which are produced by spontaneous, redox or other radical polymerization processes, and optionally after having previously been converted into a more reactive form, are treated with solutions of alkali metal hydroxides, for example sodium-, potassium-, and lithium-hydroxide and/or other strong inorganic and/or organic bases, for example ammonia, and particularly tertiary amines such as triethyl amine or methylamine. Water is used as solvent for the bases. It is to be understood, furthermore, that by mixed polymerizates of the acroleins it is meant, in particular, those which are still soluble in aqueous $SO_2$ solutions. In this regard it is preferable and advantageous to use mixed polymerizates of acrolein and vinyl compounds; especially acrylonitriles.

The polymerizates which can be used within this invention are described in "Makromolekulare Chem." 24 (1957), 150. Homopolymerizates are specially suited.

A Cannizzaro disproportionation reaction evidently takes place in the process according to the invention. It is surprising that the aldehyde groups in the polyacrolein could undergo this reaction as the carbonyl groups are located on secondary C atoms of the polymer chain, and it would be expected, that an aldol condensation would take place instead of the Cannizzaro reaction. (In this regard, see Houben-Weyl, 4th ed., volume 7/1, page 135 ff.)

It is advantageous in conducting the process according to this invention if the concentration of the alkali metal hydroxides and the bases used is over ½ normal. The reaction temperature can be between 20 and 100° C. The operating temperature can be manipulated within this range to affect the speed of the reaction as well as, within certain limits, even the degree of conversion. The degree of conversion can be followed during the course of the reaction by periodic titrations to determine the number of carboxyl groups produced and can be stopped at any desired point. In case it is necessary to isolate the polymeric reaction products, this can be done by the addition of precipitating agents, such as methanol, or by acidifying the reaction mixture.

A preferred mode of procedure in carrying out the process according to this invention consists in pretreating the polyacrolein in a suitable manner before subjecting it to the reaction with the strong base so that the polyacrolein is transformed into a more reactive form. One suitable form of such pretreatment consists in that the polyacroleins are first converted into the sulfurous acid addition compound by being dissolved in aqueous sulfurous acid or in a sodium bisulfite solution. Another pretreatment consists in the conversion of the polyacrolein to the hydrated form by reacting it with water, dilute acids, dilute alkali metal solutions such as N/10 sodium hydroxide solutions or other dilute bases, which however are still not strong enough to effect, at this point, the Cannizzaro disproportionation reaction which is to be performed subsequently.

It is particularly advantageous in conducting the process according to this invention to proceed directly with a latex that has been produced by emulsion polymerization, since such polyacroleins are in a particularly good reactive form for the purposes of this process.

The reaction products in the ideal case, where there is a complete reaction, are polyhydroxy-polycarboxylic acids which contain an equal number of primary alcohol groups and carboxyl groups per molecule. They are strong polyelectrolytes and are soluble in ammonia and sodium hydroxide as well as in organic bases, formamide and dimethyl formamide.

These hydroxyl and carboxyl groups can be converted by familiar techniques into such derivatives as esters and the like. With the use of strong acids or higher temperatures an intermolecular esterification can also be achieved, which results in cross-linkages and therefore insoluble polymers.

The polymers or their salts or their derivatives are useful as protective colloids, thickening agents and wetting agents. They can be utilized in many ways in the tanning, paper and textile industries, for the production of adhesives and paints, in the dyeing of textiles and leather, for the production and finishing of films, natural and synthetic fibers and threads.

They are also suitable for combining or reacting with polyalcohols such as polyvinyl alcohol, particularly in the form of films, threads and so forth, polymeric carbohydrates, natural or synthetic polyamides and other synthetics.

Example 1

1 g. of polyacrolein, which had been produced by redox polymerization procedures, was moistened with 5 cc. of water and allowed to stand about 12 hours at room temperature. Then, 25 cc. of N sodium hydroxide were added with vigorous stirring, whereupon the polymer completely dissolved within 1 to 60 minutes. The dissolving time depends on the type polymer and the operating conditions. The carboxyl group content of the polymer was periodically ascertained during the course of the polymerization by titrating samples of the polymerizate. After 24 hours at 20° C., 0.25 mol of COOH per mol of acrolein contained in the polymer had formed and after 3 hours at 50° C., 0.27 mol and after 1 hour at 100° C., 0.29 mol had formed. The theoretically possible yield was 0.5 mol. The reaction product was precipitated out by neutralizing the polymerization mixture with acetic acid.

Example 2

10 g. of polyacrolein, which had been produced by a reduction polymerization, were covered with 100 ml. of a 7% by weight aqueous solution of sulfur dioxide and allowed to stand at room temperature until a clear, viscous solution had been produced. This can take 2 to 24 hours depending on the polymerization conditions employed in the production of the polyacrolein. 250 ml. of a N sodium hydroxide solution were then added and the mixture was heated at 50° C. for 3 hours. The reaction mixture was useful, as is, after adjusting the pH to the desired value. If necessary, the salts can be removed by dialysis or ion exchange techniques.

Example 3

1 g. of polyacrolein, which had been produced by redox polymerization procedures (molecular weight 40,000), was moistened with 5 cc. of N/10 sodium hydroxide solution and allowed to stand about 12 hours at room temperature. Then, 25 cc. of N sodium hydroxide were added with vigorous stirring, whereupon the polymer completely dissolved within 1 to 60 minutes. The carboxyl group content of the polymer was periodically ascertained during the course of the polymerization by titrating samples of the polymerizate. The reaction product was precipitated out by neutrailizing the polymerization mixture was acetic acid.

Example 4

Example 3 was repeated, except that instead of 5 cc. of an about N/10 sodium hydroxide there were used 5 cc. of N/10 hydrochloric acid to put the polyacrolein into a more reactive form.

Example 5

Example 2 was repeated, except that the 250 ml. N sodium hydroxide solution was replaced by 500 ml. of an about N trimethylamine solution. Upon adding this solution, the reaction mixture became yellow. By the addition of 2 N hydrochloric acid or acetone the reaction product was precipitated.

We claim:

1. A process for the production of polymeric hydroxycarboxylic acids consisting of mixing an acrolein polymer selected from the group consisting of a macromolecular homopolymer of acrolein which has been produced with the aid of a redox polymerization catalyst, such homopolymer in hydrated form and such homopolymer in the form of a sulfurous acid addition compound with a solution of an alkali metal hydroxide which is of a concentration higher than half normal.

2. A process as in claim 1 in which said solution is an aqueous solution.

3. A process as in claim 1 in which said mixing is conducted within a temperature range of 20 to 100° C.

4. A process as in claim 1 in which said polymer is in the form of a latex produced by emulsion polymerization techniques.

5. A macromolecular polymeric polyhydroxy-polycarboxylic acid containing an equal number of primary alcohol groups and carboxyl groups per molecule, said polymeric polyhydroxy-polycarboxylic acid being obtained by mixing an acrolein polymer selected from the group consisting of a macromolecular homopolymer of acrolein produced with the aid of a redox polymerization catalyst, such homopolymer in hydrated form and such homopolymer in the form of a sulfurous acid addition compound with a solution of an alkali metal hydroxide which is of a concentration higher than half normal, said polymeric polyhydroxy-polycarboxylic acid compound being a strong polyelectrolyte and being soluble in a solvent selected from the group consisting of ammonia, sodium hydroxide, formamide and dimethyl formamide.

6. A macromolecular polymeric polyhydroxy-polycarboxylic acid containing an equal number of primary alcohol groups and carboxyl groups per molecule, said polymeric polyhydroxy-polycarboxylic acid being obtained by mixing and reacting a macromolecular homopolymer of acrolein with a solution of an alkali metal hydroxide which is of a concentration higher than half normal, said homopolymer of acrolein being produced with the aid of a redox polymerization catalyst.

References Cited by the Examiner

UNITED STATES PATENTS 2,809,186   10/1957   Smith et al. _____ 260—67

FOREIGN PATENTS 1,040,244   10/1958   Germany.

OTHER REFERENCES

Karrer: Organic Chemistry, Elsevier Publ. Co., N.Y. (1946), pp. 244–245.

Noller: Chemistry of Organic Compounds, second ed. (1957), pp. 481–2 relied on, W. B. Saunders Co., Philadelphia.

WILLIAM H. SHORT, *Primary Examiner.*

HAROLD N. BURNSTEIN, MILTON STERMAN, JOSEPH R. LIBERMAN, *Examiners.*